United States Patent
Miller et al.

[11] Patent Number: 5,899,137
[45] Date of Patent: May 4, 1999

[54] BEVERAGE MAKING APPARATUS WITH CAN PIERCER

[75] Inventors: Paul E. Miller, Long Beach; Stephen D. Lowrie, Palmdale, both of Calif.

[73] Assignee: Weber Aircraft, Inc., Fullerton, Calif.

[21] Appl. No.: 08/782,104

[22] Filed: Jan. 13, 1997

[51] Int. Cl.[6] .................................................. A47J 31/00
[52] U.S. Cl. ........................... 99/295; 99/302 R; 99/279; 426/433
[58] Field of Search ................... 99/295, 302 R, 99/275, 279; 426/433

[56] References Cited

U.S. PATENT DOCUMENTS

| | | | |
|---|---|---|---|
| 2,952,202 | 9/1960 | Renner et al. | 99/295 X |
| 3,260,190 | 7/1966 | Levinson | 99/295 |
| 3,470,812 | 10/1969 | Levinson | 99/295 |
| 3,583,308 | 6/1971 | Williams | 99/302 R |
| 3,754,463 | 8/1973 | Vernooy | 99/302 R X |

*Primary Examiner*—Reginald L. Alexander
*Attorney, Agent, or Firm*—Lyon & Lyon LLP

[57] ABSTRACT

A coffee maker for use in a vehicle such as a commercial aircraft. The coffee make accepts a sealed can of ground coffee. The can is pierced from the side by a pair of can-piercing spikes by actuating the can against the spikes. The can is drawn by a hydraulically operated cylinder mechanism powered by the water pressure of the aircraft's potable water supply. Hot water is injected into the can through a passage within at least one of the spikes and the hot water is circulated within the can thereby brewing the coffee. Brewed coffee exits the can along the sides of one or both of the spikes and is channeled down into a reservoir located below the can. The brewed coffee may be filtered before and/or after the flowing into the reservoir. A desired volume of coffee may then be drawn from the reservoir.

23 Claims, 15 Drawing Sheets

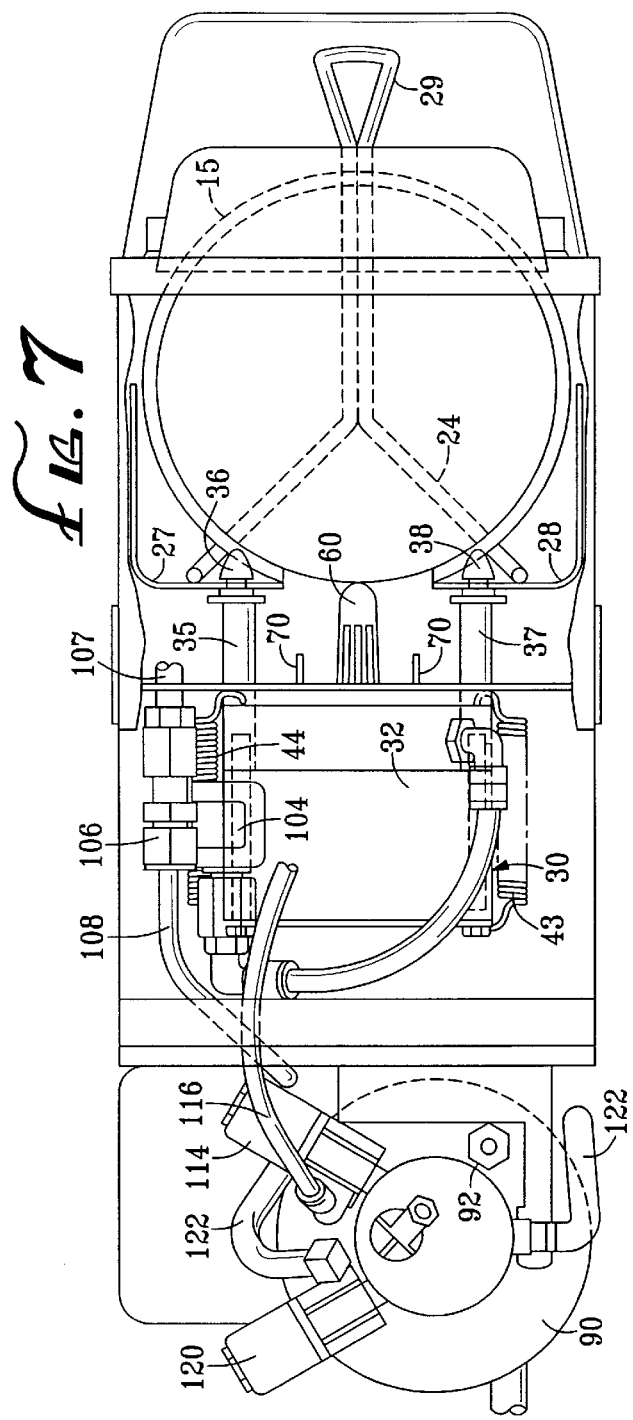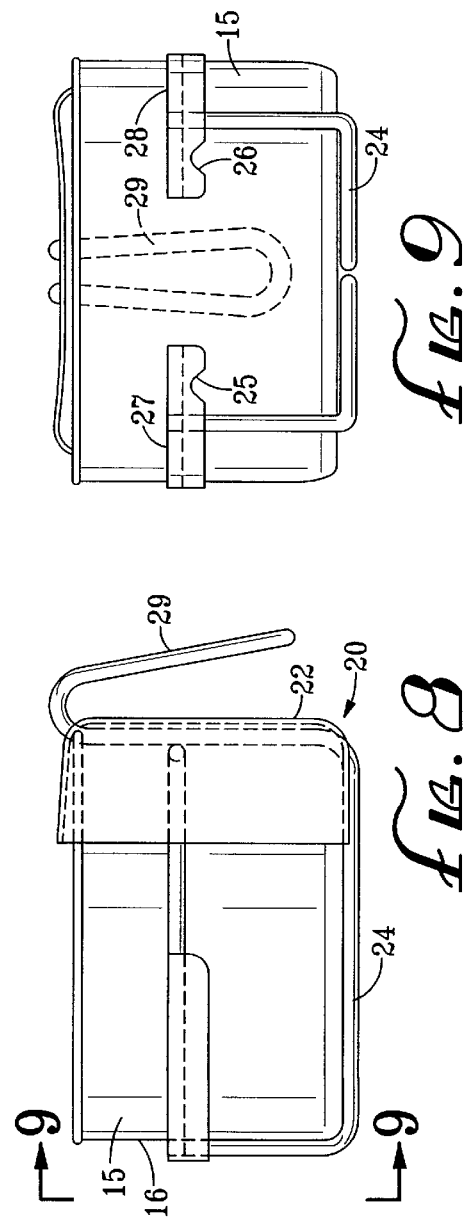

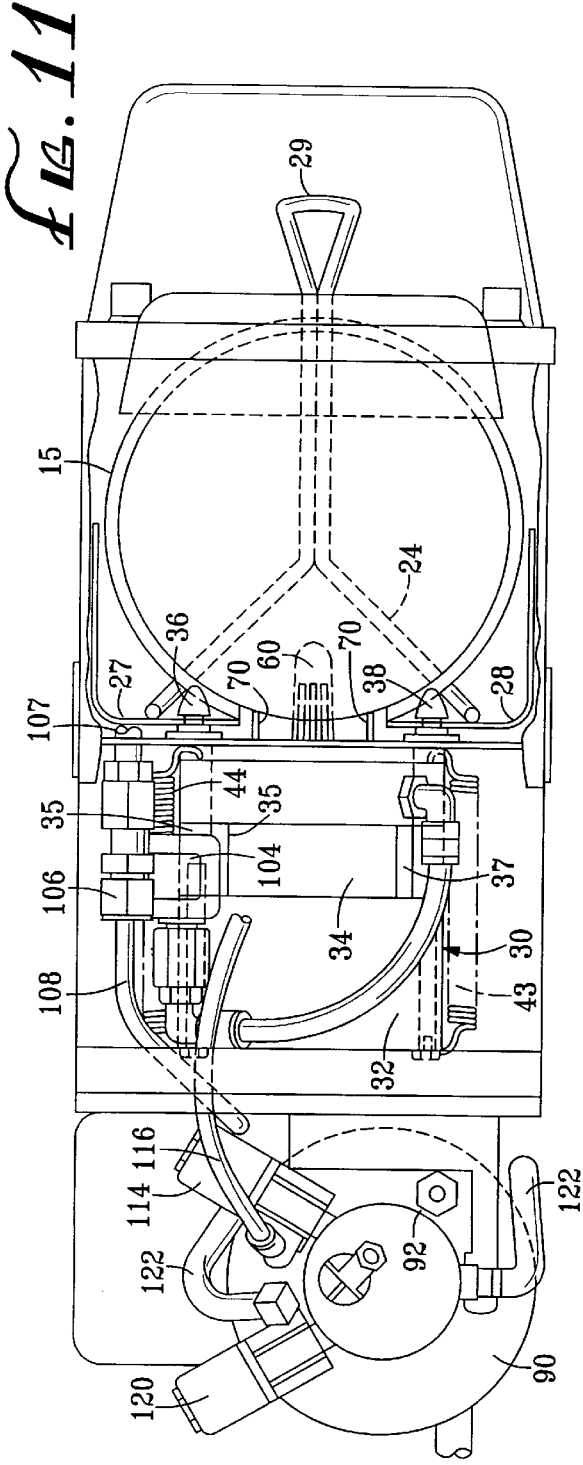
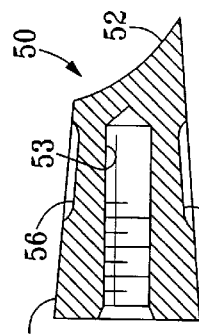
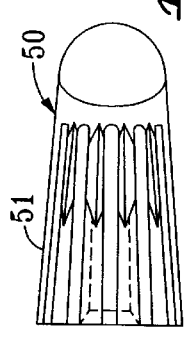
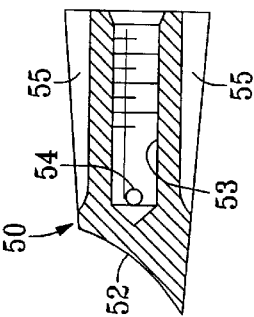
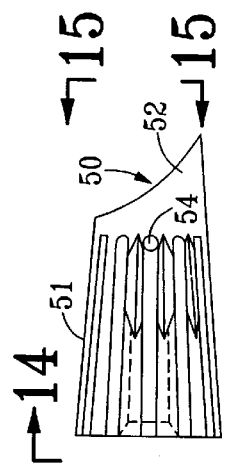
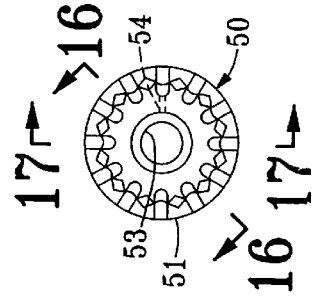

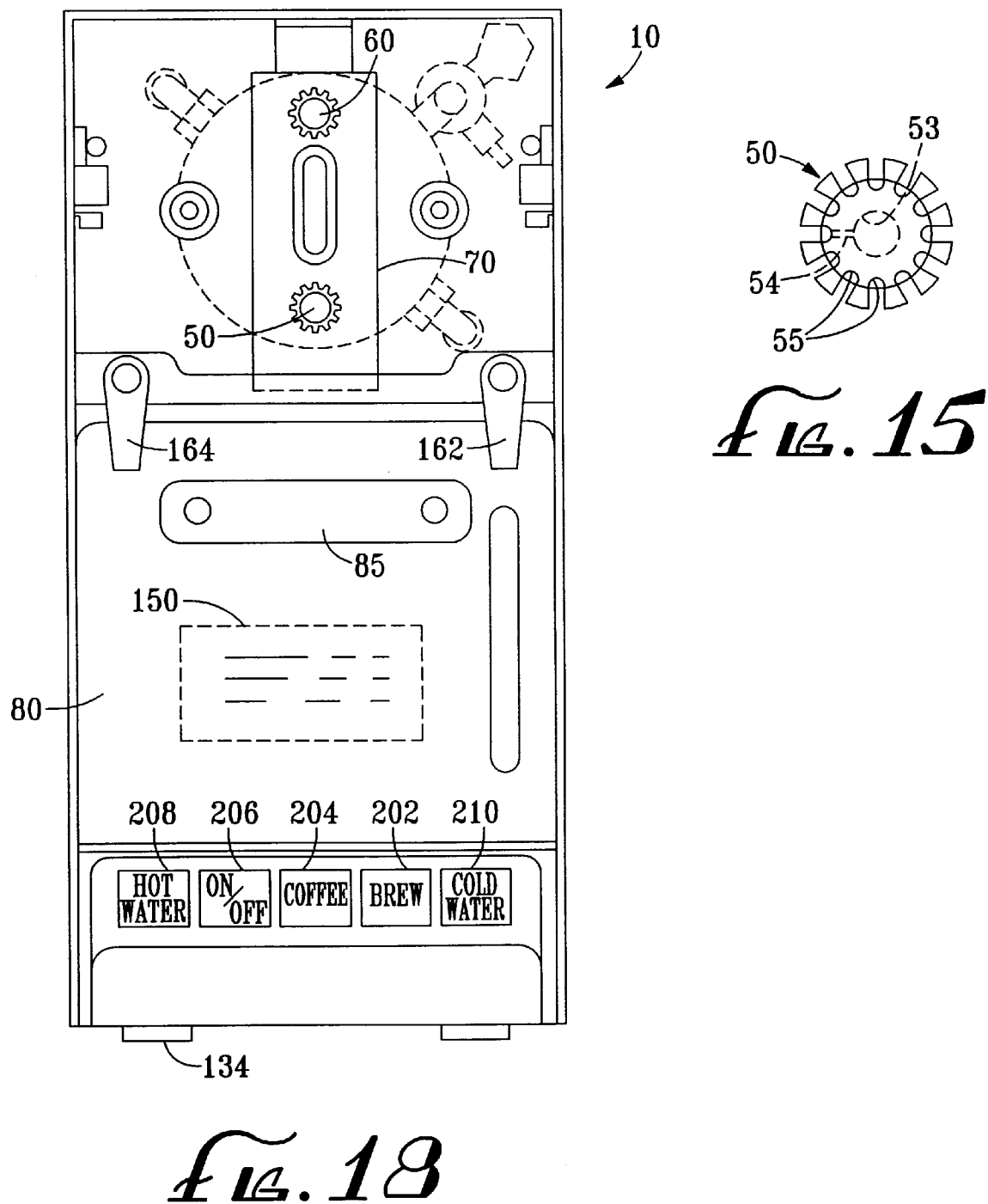

BEVERAGE MAKING APPARATUS WITH CAN PIERCER

BACKGROUND OF THE INVENTION

The field of the present invention relates to beverage makers, such as apparatus and methods for making coffee or tea, and more particularly for use in passenger service systems in commercial airlines or other vehicles.

In typical coffee makers, ground coffee is measured and placed in a receptacle over the coffee maker. In a drip type coffee maker, hot water is allowed to pass by gravity feed through the ground coffee and into the pot. A filter is positioned between the grounds and the pot to prevent grounds from entering the pot.

In a percolating type coffee maker, ground coffee is measured and placed in a receptacle. The receptacle has small holes in its wall, the holes being large enough to allow water to pass through but small enough to prevent grounds from passing through. As the water in the reservoir below the receptacle is heated, the heated water is circulated through the grounds.

In either instance, the ground coffee must be measured and placed in the receptacle requiring some sort of mechanism for measuring the ground coffee. Typically a desired amount of ground coffee is measured out with a measuring cup. The process is time consuming and requires certain cleanliness guidelines be followed by the user when handling the ground coffee.

To reduce handling requirements, the ground coffee may be pre-measured in separate containers, but the containers, typically a sealed pouch, still needs to be manually opened and poured into the receptacle. Another alternative consists of a pre-measured packet, the packet including the filter enclosing the ground coffee. The packet still requires clean handling by the user.

SUMMARY OF THE INVENTION

The present invention is directed to a beverage maker and more particularly to a method and apparatus for making coffee from a can with minimized handling. In its preferred construction, the coffee maker accepts a sealed can of ground coffee. The can is placed in a receptacle, and the can is pierced by a pair of can-piercing spikes. Hot water is injected into the can through a passage within at least one of the spikes. The hot water is circulated within the can thereby brewing the coffee. Brewed coffee exits the can along the sides of one or both of the spikes and is channeled down into a reservoir located below the can. The brewed coffee may be filtered before and/or after the flowing into the reservoir. A desired volume of coffee may then be drawn from the reservoir, filling either a cup or pot for example. Alternately, the reservoir itself may comprise a pot or receptacle which may be removed to facilitate dispensing.

BRIEF DESCRIPTION OF THE DRAWINGS

FIG. 7 is a top plan view of the coffee maker of FIG. 6;

FIG. 8 is a side view of the can and can holder of the coffee maker of FIG. 6;

FIG. 9 is a rear plan view of the can and can holder of FIG. 8;

FIG. 11 is a top plan view of the coffee maker of FIG. 6 with the can in the pierced position as in FIG. 10;

FIG. 12 is a right side view, on an enlarged scale, of the bottom can-piercing spike of FIG. 6;

FIG. 13 is a top plan view of the can-piercing spike of FIG. 12;

FIG. 14 is a rear plan view of the can-piercing spike of FIG. 12 as view along lines 14—14;

FIG. 15 is a front plan view of the can-piercing spike of FIG. 12 as viewed along lines 15—15;

FIG. 16 is a cross sectional view of FIG. 14 taken along the lines 16—16;

FIG. 17 is a cross sectional view of FIG. 14 taken along the lines 17—17;

FIG. 18 is a front plan view of the coffee maker of FIG. 6.

DETAILED DESCRIPTION OF THE PREFERRED EMBODIMENTS

Figure 1:
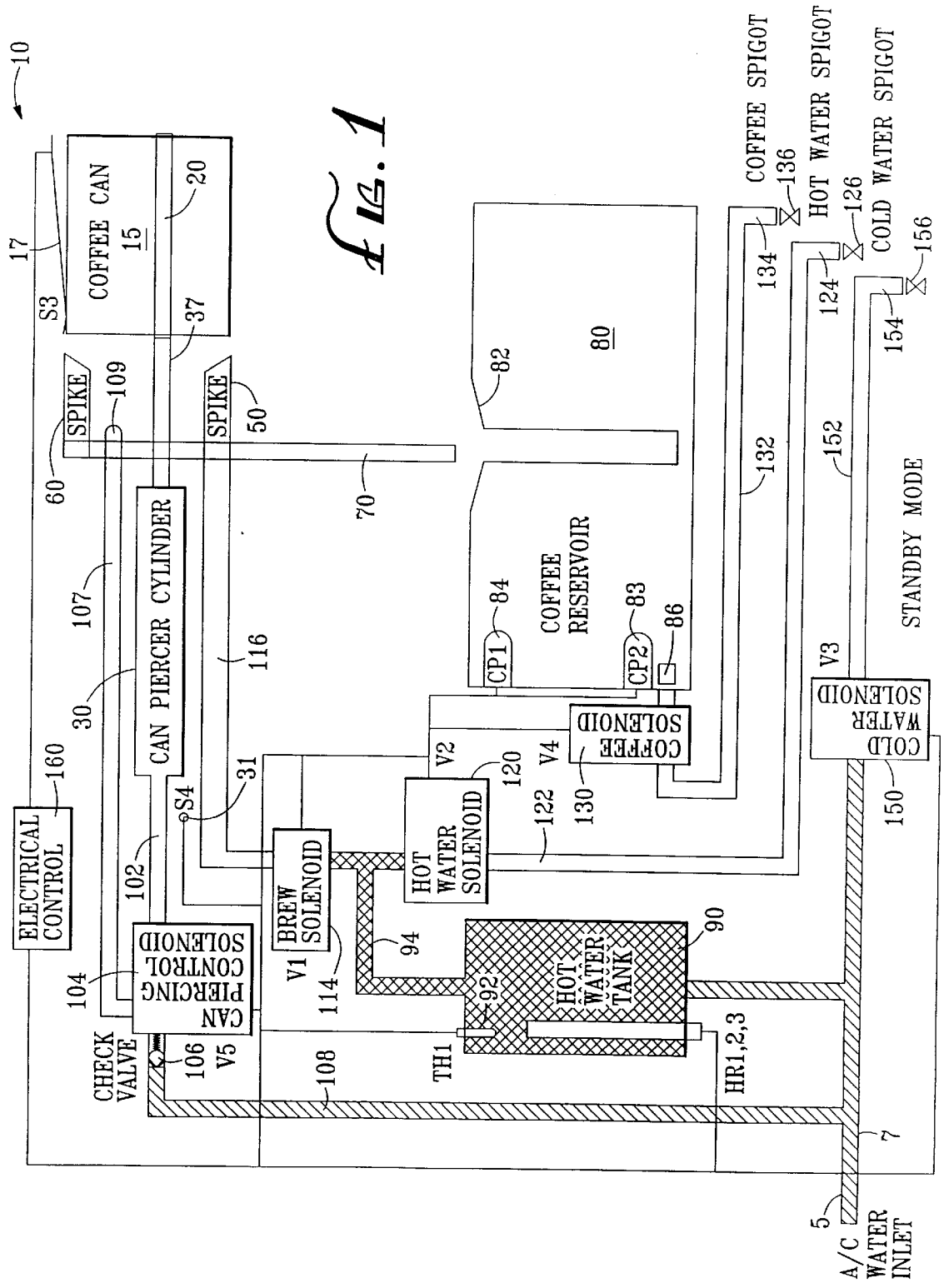
FIG. 1 is a schematic of a coffee brewing system according to a preferred embodiment of the present invention and illustrating the system being in the standby mode.
Figure 2:
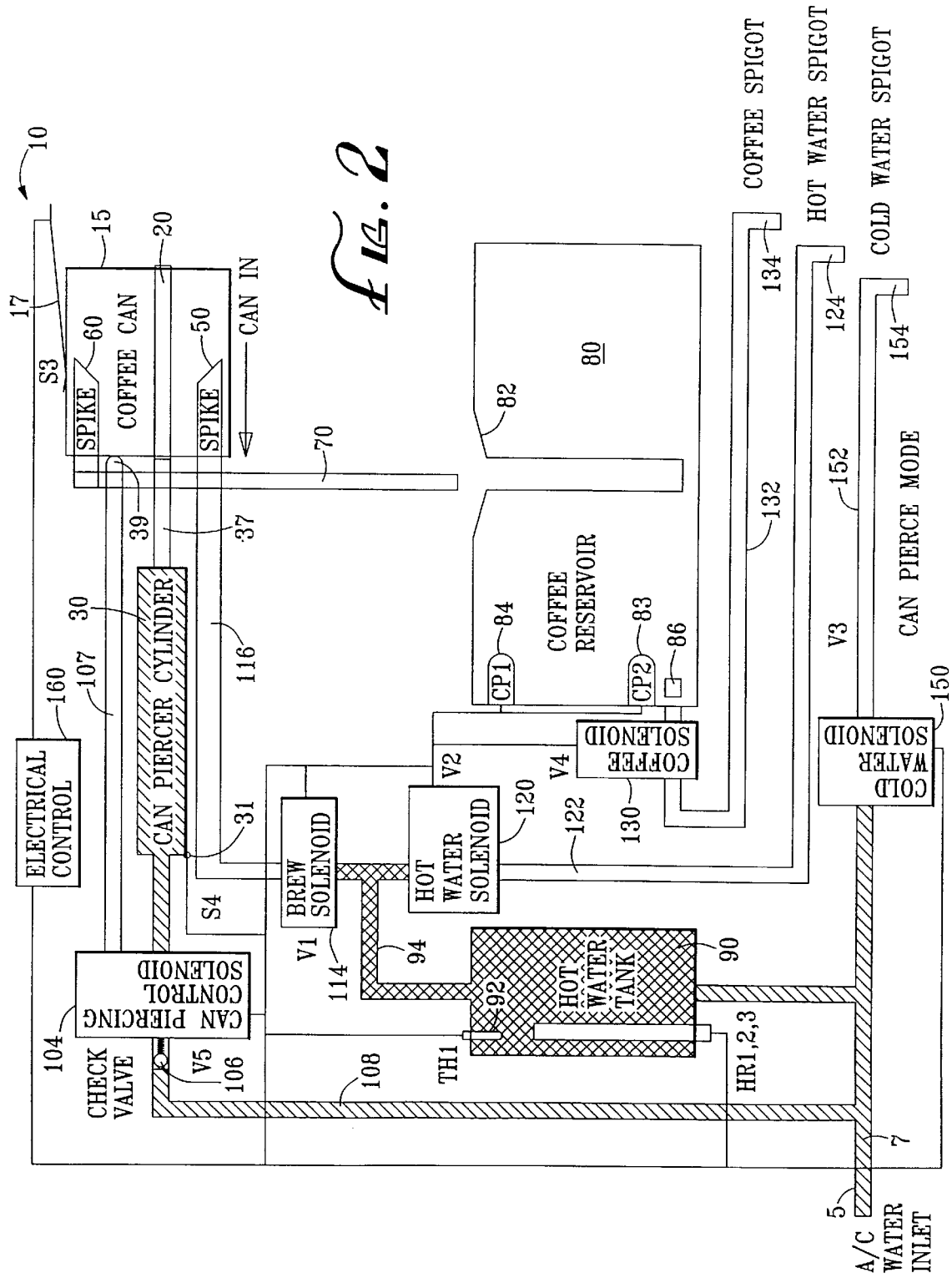
FIG. 2 is a schematic of the coffee brewing system of FIG. 1 illustrating the system in the can pierce mode.

The preferred embodiments of the present invention will now be described with reference to the drawings. To facilitate description, any identifying numeral representing an element in one figure will represent the same element in any other figure.

FIGS. 1–4 are schematics of a preferred embodiment of a coffee maker 10. In operation, a closed can 15 containing ground coffee is placed into a holder 20 of the coffee maker system 10. can actuates a switch 17 signalling to electrical controller 160 that a can has been inserted in the holder 20. Once the can 10 is placed in the holder 20 and the holder 20 and can 15 are positioned in the coffee maker 10, the user may manually actuate the holder 20 and can 15 into the spikes 50, 60. A lever (not shown) may be provided to provide suitable leverage for the piercing operation.

In its preferred embodiment, an automatic piecing mechanism is provided. Upon actuation of the brew switch 202 (see FIGS. 5 and 18), the electrical controller 160 signals the can piercer cylinder 30 to draw the holder 20 and can 15 automatically into the spikes 50, 60. The spikes 50, 60 pierce the side of the can and enter into the can. The actuation of the can piercer cylinder 30 halts upon signal from the limit switch 17 which indicates that the can has reached the desired position.

Though the can piercer cylinder 30 may operate via an electric solenoid, in its preferred configuration the cylinder 30 is operated by the water pressure from water line 102 supplied by the aircraft water supply inlet 5. Water pressure from water inlet 5 passes to the solenoid 104 via line 7 and line 108. The electrical controller 160 signals the can piercing control solenoid 104 allowing water pressure from line 108 to energize line 102 (see FIG. 2) thereby actuating the can piercer cylinder 30 which draws the can 15 into the spikes 50, 60 thereby piercing the can. A check valve 106 is provided upstream of the can piecing control solenoid 104 to prevent pressure drop in the cylinder 30 if aircraft water supply pressure drops.

Figure 3:
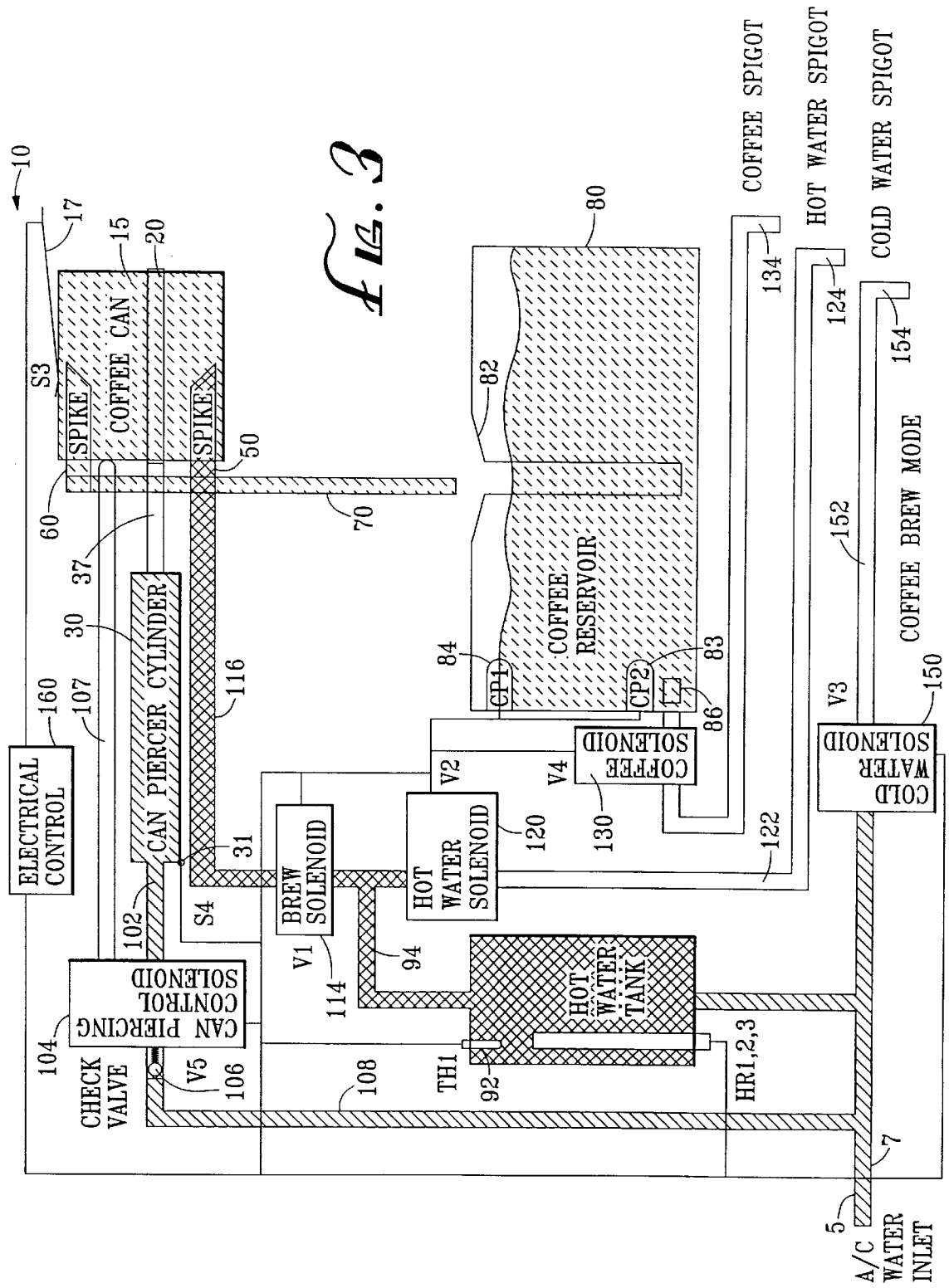
FIG. 3 is a schematic of the coffee brewing system of FIG. 1 illustrating the system in the coffee brew mode.
Figure 4:
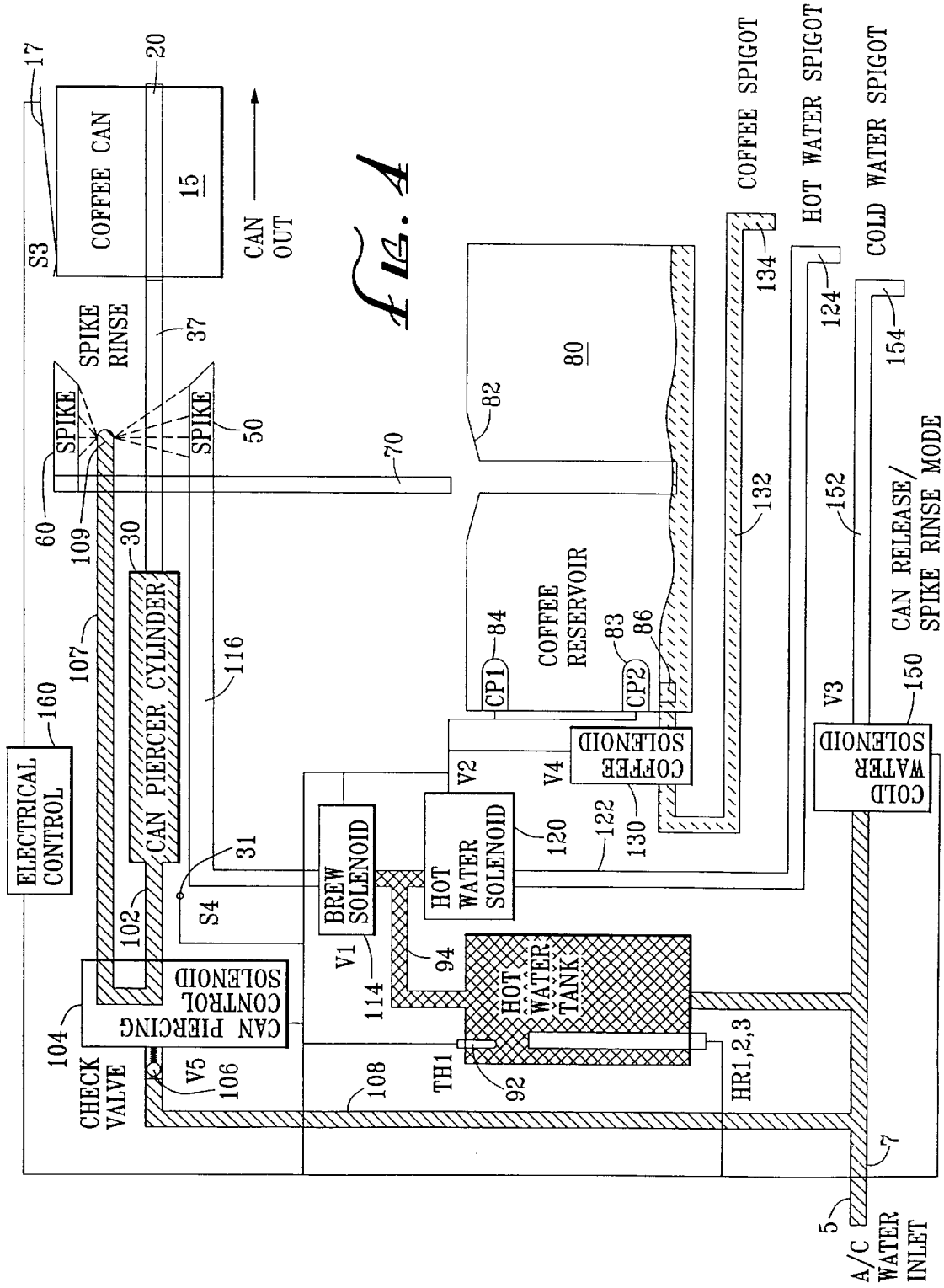
FIG. 4 is a schematic of the coffee brewing system of FIG. 1 illustrating the system in the can release/spike rinse mode.
Figure 5A:
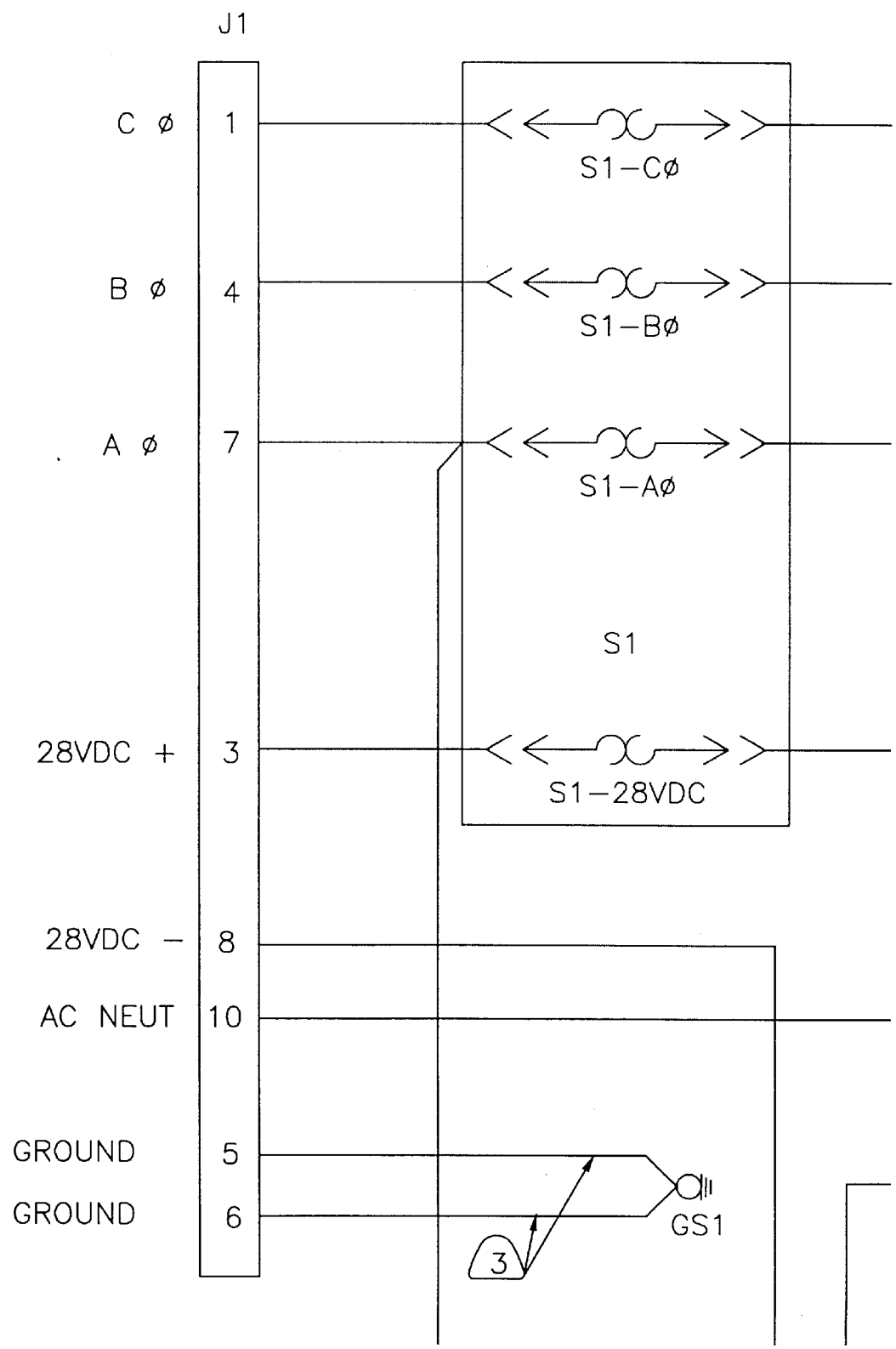
FIG. 5 is a preferred wiring schematic for the coffee brewing system of FIG. 1.
Figure 5B:
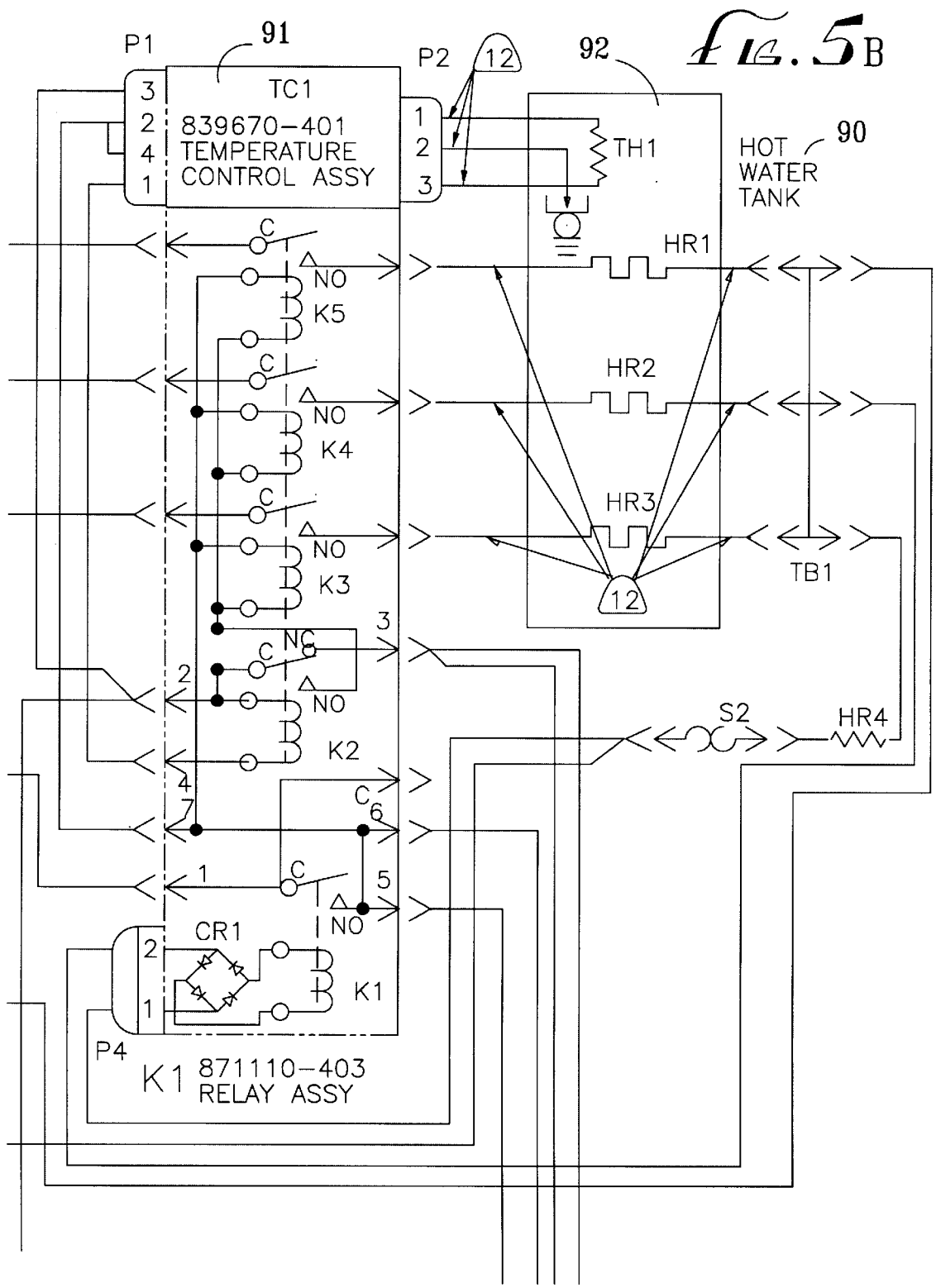
Figure 5C:
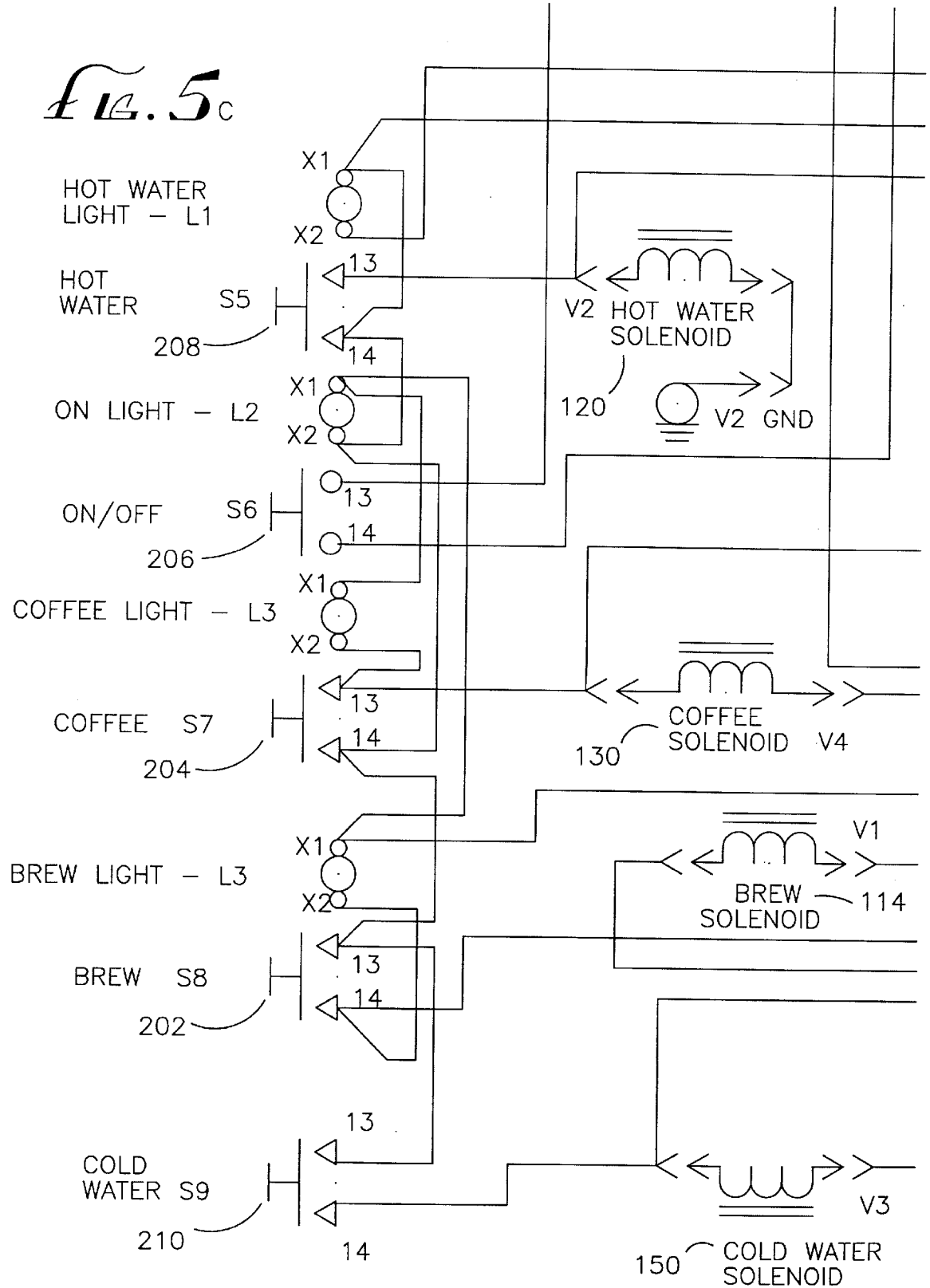
Figure 5D:
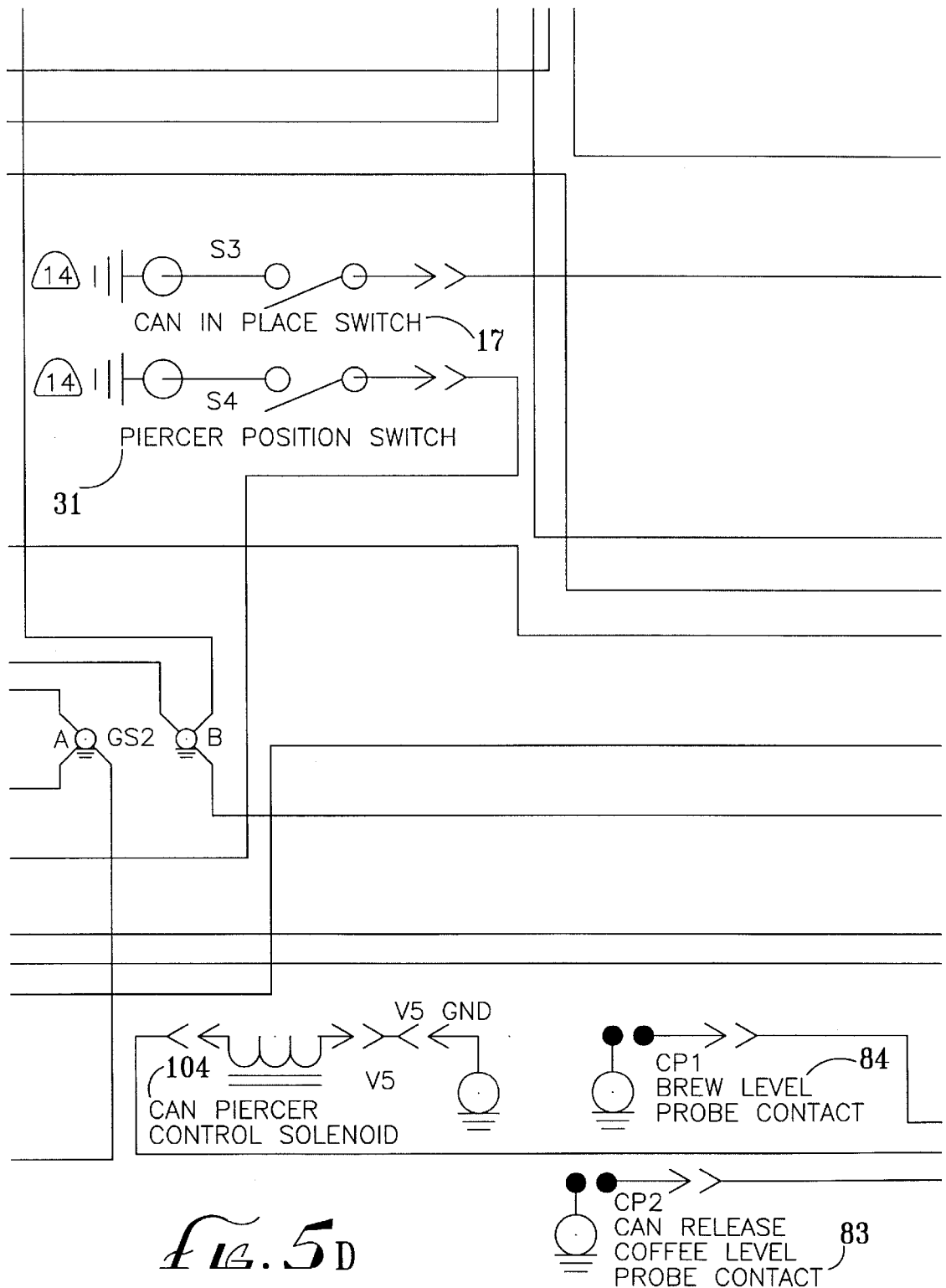
Figure 5E:
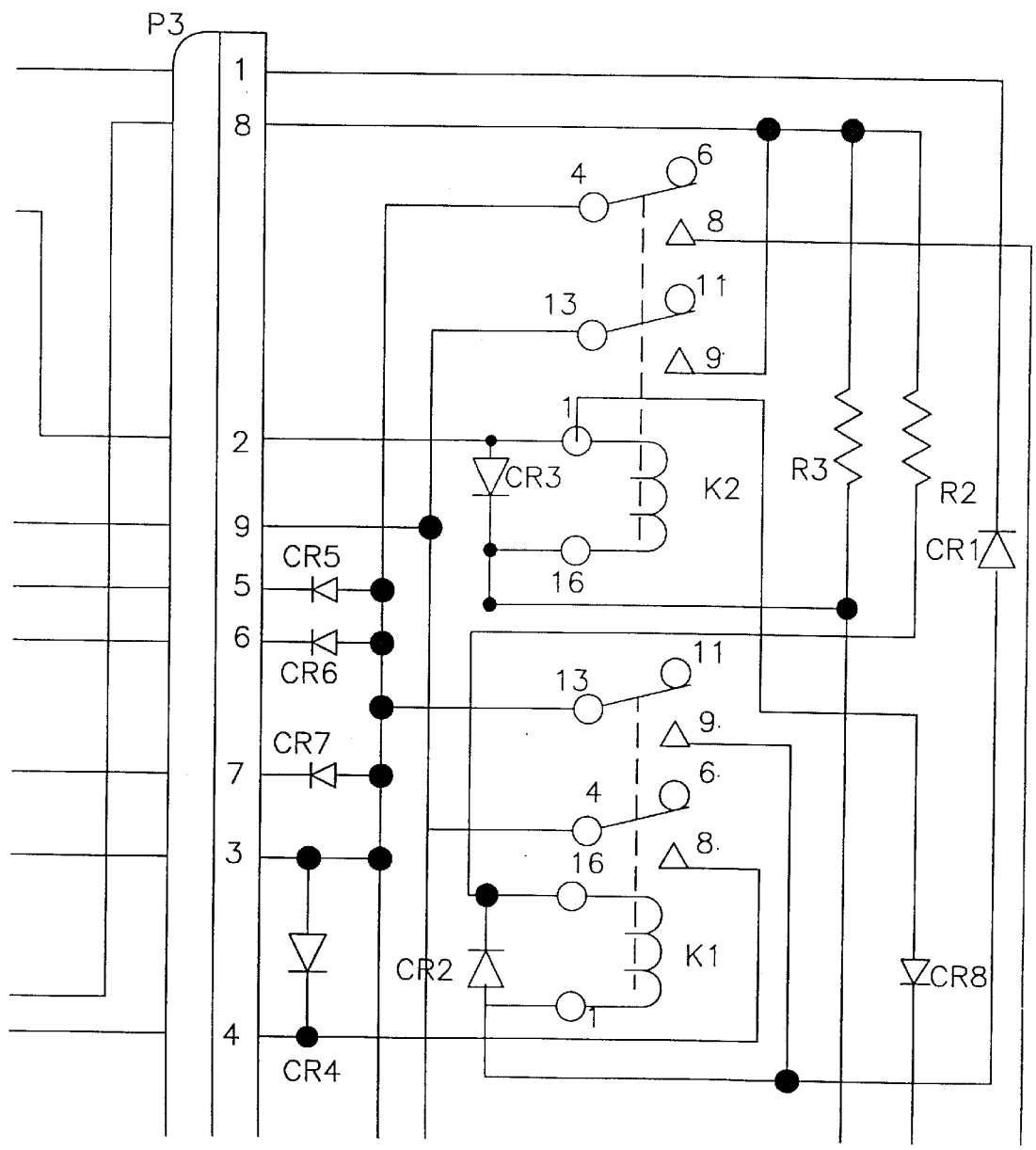
Figure 5F:
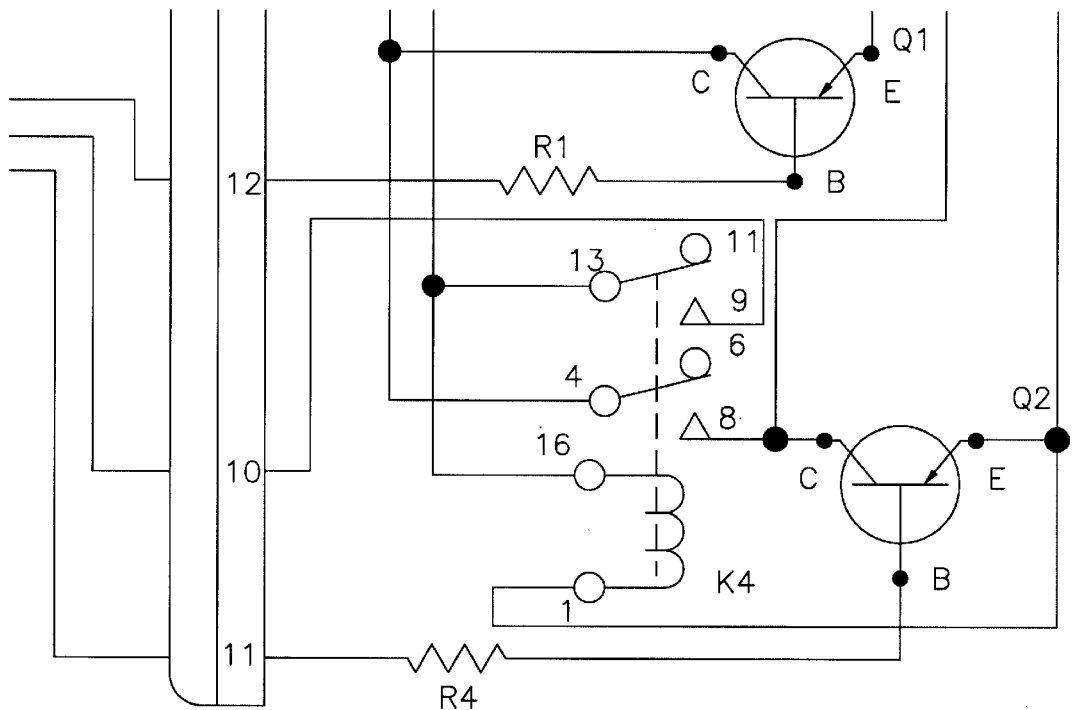

The water inlet 5 is also connected via line 7 to hot water tank 90. As shown in FIGS. 1–5, the hot water tank 90 includes heating elements HR1, HR2, HR3 controlled via temperature control assembly 91 and thermostat 92. Hot water is then provided via line 94 from the hot water tank 90 to the brew solenoid 114. As illustrated in FIG. 3, once the can 15 has been pierced by spikes 50, 60, the brew solenoid 114 is signaled by the controller 160 to open allowing hot water from the hot water tank 90 to pass through line 116 into the lower spike 50. The spike 50 has an internal opening which allows water to pass into the can 15. The hot water is then circulated through the can 15 brewing the coffee. Brewed coffee is then permitted to exit the can 15 along the outer perimeter of the spikes 50, 60 (the spikes having grooves or channels along their outer surfaces as will be described further below) and down channel 70 into the coffee reservoir 80 as shown in FIG. 3. The reservoir 80 includes a funnel 82 to direct the brewed coffee into the reservoir 80. As the brewed coffee level in reservoir 80 reaches a desired level at sensor 84, the controller 160 is signalled and the brew solenoid 114 is closed stopping the brew cycle. As shown in FIG. 4, once the brew cycle is completed, the coffee solenoid 130 is actuated allowing coffee from the reservoir 80 to pass through line 132 to the coffee spigot 134 allowing the user to fill a suitable container (such as a pot or a cup) to the desired level.

The coffee reservoir 80 is provided with a filter, shown schematically as element 86, to prevent grounds from entering the coffee solenoid 130 so grounds are not dispensed through the coffee spigot 134.

A separate manual actuation valve 136 may be provided at the spigot 134. In its preferred mode, a switch 204 (see FIG. 18) actuates the coffee solenoid 130 for dispensing coffee through the spigot 134 without requiring the valve 136.

Once coffee has been dispensed, the controller 160 signals the can piercing control solenoid 104 allowing a bleed off of the pressure in line 102 to the can piercer cylinder 30 through line 107 to spike rinse 109 (see FIG. 4). Cold water passes from the spike rinse 109 washing grounds or coffee off of the spikes 50, 60 and down into the reservoir 80. Once the pressure is released from the can piercer cylinder 30, the now spring loaded cylinder (described in more detail below) releases the can 15 and holder 20 from the spikes 50, 60 and permits the can 15 to be removed from its holder.

The coffee maker system 10 also includes a hot water solenoid 120 connected to the hot water line 94. Upon actuation of the switch 208 (see FIG. 18), hot water is dispensed through line 122 to the hot water spigot 124. Again a separate manual valve 126 may be provided at the spigot 124.

A cold water solenoid 150 may also be provided and attached to the inlet line 7. Upon actuation of the cold water switch 210 (see FIG. 18), cold water is allowed to pass via line 152 to the cold water spigot 154. As with the other spigots, a manual valve 156 may be provided at the spigot 154.

FIG. 5 is a detailed electrical schematic of the brew system described above with respect to FIGS. 1–4. The schematic of FIG. 5 illustrates the connections for the various control solenoids, namely the can piercer solenoid 104, the brew solenoid 114, the coffee solenoid 130, the hot water solenoid 120, and the cold water solenoid 150. The switch 17 (the can in place switch) and the piercer position switch 31 are also illustrated. When the coffee level in the reservoir 80 drops to below the probe contact 83, the probe 83 signals the electrical controller 160 indicating that the coffee reservoir is complete upon which the can piercing control solenoid opens passage to line 107 to release the pressure in can piercer cylinder 30 as previously described.

Other configurations are possible. For example, the spikes may be actuated into the can, the can being stationary. Such a configuration would require the water inlet line 116 to be flexible or provide some other suitable means to accommodate movement of the spike 50.

FIGS. 6–18 illustrate preferred physical construction for the systems of FIGS. 1–5. As shown in FIGS. 8–9, a can of ground coffee 15 may be inserted within the holder 20 which is removable from the coffee maker 10. The holder 20 includes a handle 29, a rear frame piece 22 and a bottom triangular frame piece 24 which may also be viewed in FIG. 7. The handle 29 is of a shape, size and material such that it dissipates heat so as not to burn the user's hand. The holder 20 includes side panels 27, 28 which surround the can 15 when it is inserted within the holder 20. The side frame portions 27, 28 include notches 25, 26. When the can 15 and can holder 20 are inserted into the coffee maker 10, the notches 25, 26 engage the heads 36, 38 at the ends of rods 35, 37. The rods 35, 37 are connected to the can piercer cylinder 30 (see FIGS. 6–7).

Potable water from the aircraft water supply 5 passes via line 7 into the hot water tank 90. The water in the hot water tank 90 is heated by the heating elements controlled via a thermostat 92. The inlet water line 7 is also connected to line 108 to provide water pressure which serves as a hydraulic actuation pressure for the can piercer cylinder 104. A check valve 106 is provided at the entry to the can piercer cylinder 104 to prevent pressure drop in the cylinder 30 if aircraft water supply pressure drops.

Figure 6:
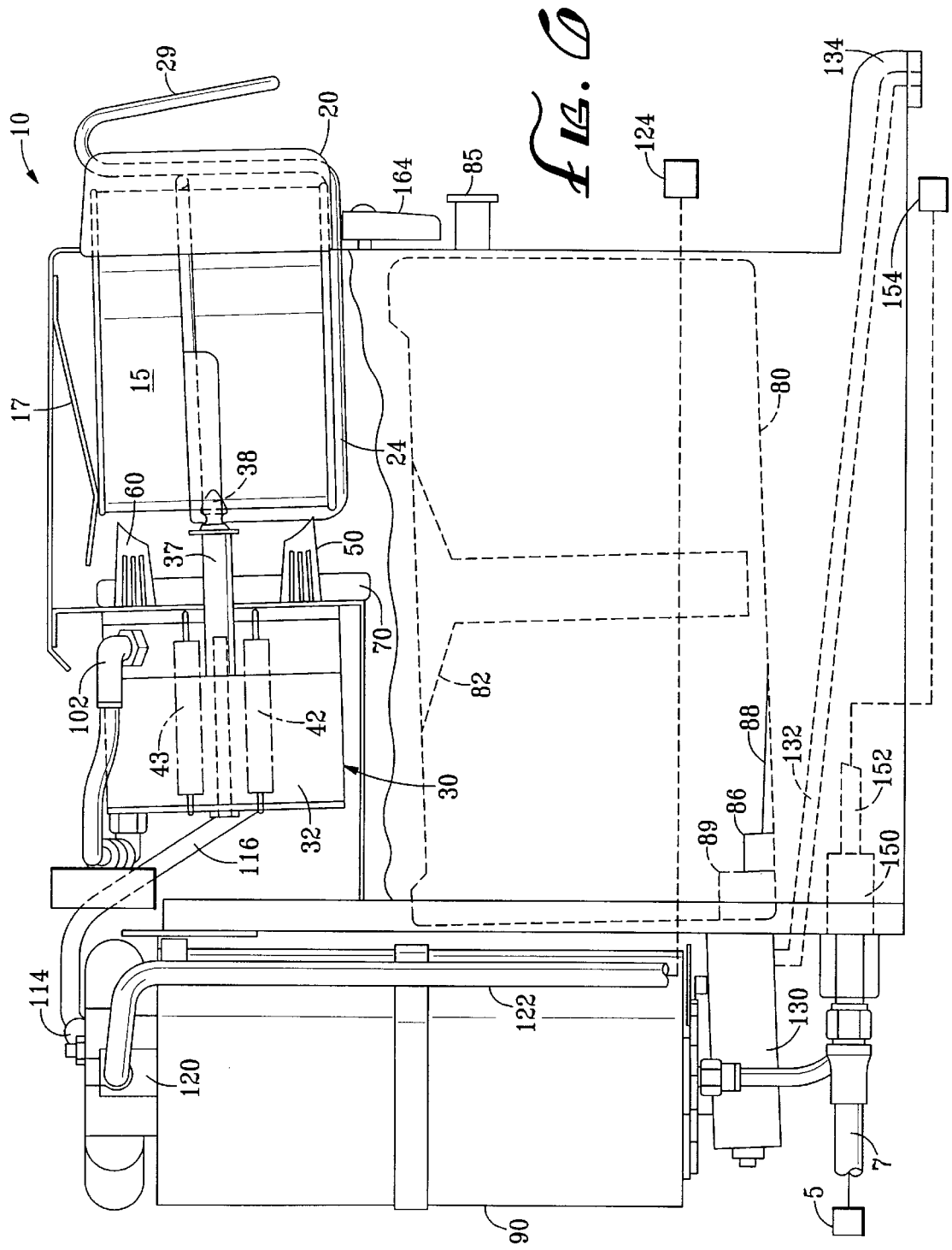
FIG. 6 is a side view of a preferred embodiment of the coffee maker system of FIG. 1 with the can in the standby position.
Figure 10:
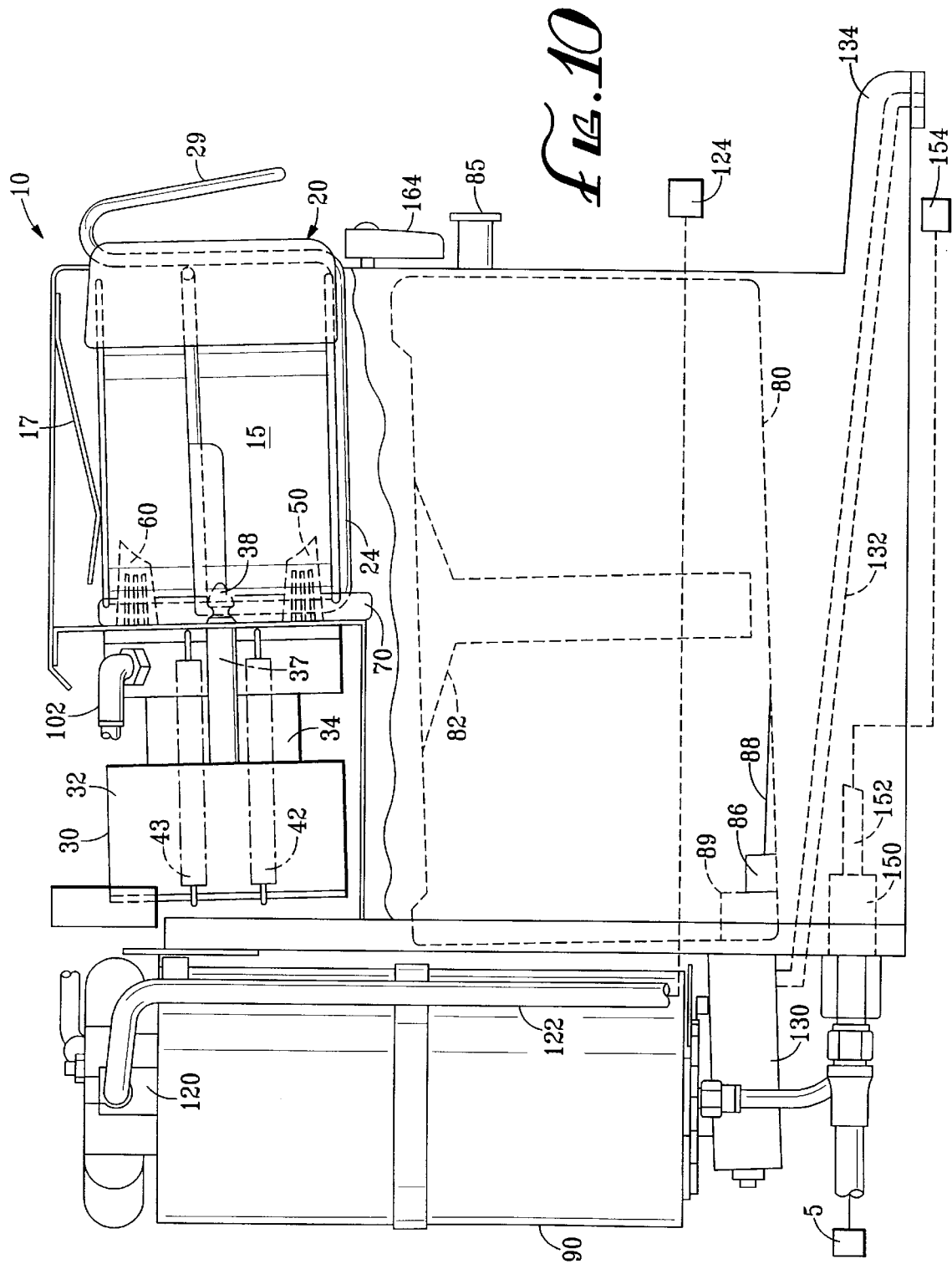
FIG. 10 is a side view of the coffee maker of FIG. 6 with the can in the pierced position.

Once the can 15 and holder 20 are in place, the user actuates the brew switch 202 and the can piercer control solenoid 104 allows water to pass into the can piercer cylinder 30 actuating the cylinder 32 relative to the piston 34 moving the cylinder 32 to the left as viewed in FIGS. 6 and 7 to the position shown in FIGS. 10 and 11. As the cylinder 32 is actuated, the springs 42, 43 and 44 are stretched as the cylinder 32 is biased into the position as in FIGS. 6 and 7. There are actually four springs (the fourth spring not being visible in the drawings), two springs on each side of the cylinder 32. The fourth spring is positioned below spring 44 in a similar manner as spring 42 is situated below spring 43 (see FIG. 6).

As illustrated in FIGS. 6 and 10, the can 15 is inserted in an upright orientation, meaning that the cylindrical sides 16 of the can 15 are oriented vertically and the flat top and bottom are horizontal. The piercing means 30 moves the can 15 so that the can's rounded side is pierced by the spikes 50, 60. Piercing the can 15 from the side, as opposed to piercing the top or bottom, helps reduce overall height requirement for the coffee maker 10.

As the cylinder 32 is actuated to the left (as viewed in FIGS. 6 and 10), the rods 37, 35 draw the can holder 20 and can 15 toward the spikes 50, 60 thereby piercing the side of the can 15. Once the can 15 is pierced and the spikes 50, 60 are in position inside the can 15, the brew solenoid 114 is opened allowing hot water to pass via line 116 to the lower spike 50.

As shown in the details of FIGS. 12–17, the spike 50 includes a generally cylindrical side wall 51, a sharp point 52 on one end, and an internal passage 53 commencing on the other end. The channel 53 is connected to the brew inlet line 116. Hot water is directed into the channel 53 and out through an exit hole 54 passing from the channel 53 through the side wall of the spike 50 and injected into the can 15. Hot water is then circulated through the can 15 mixing with the coffee grounds thereby brewing the coffee. The exit hole 54 is preferably in a side wall of the spike 50, directing the water flow perpendicular to the longitudinal inner passage 53, so as to promote a swirling water flow within the can 15 generally following the can's cylindrical side wall. Alternately, the exit hole 54 may be located at the end of the spike 50 so that the water flow is directed generally radially inward into the can 15.

The spike 50 includes external longitudinal channels or flutes 55 along its outer periphery as best viewed in FIGS. 15 and 17. The flutes 55 are separated by shorter channels 56 spaced between them. The width of each flutes 55 is large enough to allow passage of liquid, namely the brewed coffee, along the flute but small or narrow enough to inhibit passage of coffee grounds out of the can 15.

The configuration of the upper spike 60 is similar to the configuration of the lower spike 50 except the upper spike 60 does not include the opening 54. The upper spike 60 could alternately be connected to the inlet water line 116 and a spike would then be provided with an inner passage and opening (similar to elements 53 and 54 in the lower spike 50) to allow injection of water through the upper spike 60. It is preferred, however, only to inject water through the lower spike as it believed to improve the brewing circulation of water within the can 15.

As the hot water in continued to be injected into the can 15, the brewed coffee passes along the flutes 55 in the outer periphery of the spikes 50, 60 and then directed downwardly by gravity flow along channel 70 where it is directed by funnel 82 and collected within reservoir 80.

Once the brewed coffee reaches a desired level at sensor 84 (see FIG. 30), the brew solenoid 114 is closed, ceasing injection of hot water from the heating tank 90 and stopping the brew cycle. Brewed coffee will continue pour out of holes in the can 15 along the sides of the spikes 50, 60 and down into the reservoir 80 until the liquid level in the can 15 drains below the level of the spike 50. To dispense the coffee, the user actuates the coffee solenoid 130 allowing coffee from the reservoir 80 to pass through line 132 to the coffee spigot 134 allowing the user to fill either a pot or a cup to the desired level.

The coffee reservoir 80 is provided with a filter, shown schematically as element 86, to prevent grounds from entering the coffee solenoid 130 so grounds are not dispensed through the coffee spigot 134. In addition, the bottom of the reservoir 80 may be sloped (the slanted bottom is visible as slanting downwardly to the left as in FIG. 6) toward the exit port to allow for more complete draining thereof. The bottom of the reservoir may also include a channel 88 to further allow for more complete draining of the reservoir 80.

The reservoir 80 may also be equipped with a one-way valve which allows coffee to pass through when the reservoir 80 is in place in the coffee maker 10 and which closes when the reservoir is removed for preventing spillage upon such removal.

A separate manual actuation valve 136 may be provided at the spigot 134 providing extra protection from spillage. In its preferred mode, a switch 204 (see FIG. 18) actuates the coffee solenoid 130 for dispensing coffee through the spigot 134 without requiring the valve 136.

Once coffee has been dispensed, the controller 160 signals the can piercing control solenoid 104 to open to line 107 allowing a bleed off of the pressure in line 102 to the can piercing cylinder 30 through line 107 to spike rinse nozzle 109 (as described with respect to FIG. 4). Cold water sprays out from the spike rinse 109 to wash grounds or coffee off of the spikes 50, 60 and down into the reservoir 80. The spray from nozzle 109 may also rinse channel 70. Once the pressure is released from the can piercing cylinder 30, the four springs 42–44 (which are in tension from the position as in FIGS. 8–9) retract the can 15 and holder 20 from the spikes 50, 60 back to the position as in FIGS. 6–7 thereby exposing the spikes to the water rinse from nozzle 109. Once the can is released from the spikes 50, 60, the holder 20 may then be removed from the coffee maker and the can 15 may then be ejected from its holder 20.

Once used and removed, the can 15 may be thrown away. Brewing the coffee in the disposable can 15 provides several advantages, including for example:

handling and disposal of used material is minimized;
handling of food, namely the ground coffee, is eliminated;
measuring of coffee is eliminated;
the number of coffee maker parts needed to be cleaned after use is minimized.

The coffee maker system 10 also includes a hot water solenoid 120 connected to the hot water outlet from the heating tank 90. Upon actuation of the switch 208 (see FIG. 18), hot water is dispensed through line 122 to the hot water spigot 124.

A cold water solenoid 150 may also be provided and attached to the inlet line 7. Upon actuation of the cold water switch 210 (see FIG. 18), cold water is allowed to pass via line 152 to the cold water spigot 154.

FIG. 18 illustrates a front view of the coffee maker 10 with the can 15 and can holder 20 removed. Handles 162, 164 may be rotated to allow removal of the reservoir 80 for cleaning. The reservoir 80 would preferably include a check valve 89 approximate its bottom exit port. The check valve 89 would close off preventing exit of fluid from the reservoir 80 upon its removal from the coffee maker 10. The reservoir 80 also includes a handle 85 to facilitate reservoir removal from coffee maker 10.

The coffee maker 10 is provided with operational instructions 150 (see FIG. 18), preferably placed on a label or plate in a prominent location on the front face of the unit. A preferred set of instructions is as follows:

1. PRESS ON/OFF BUTTON. BUTTON LIGHTS WHEN ON.
2. PLACE EMPTY RESERVOIR IN COFFEE MAKER (IF REMOVED).
3. PLACE COFFEE CAN IN HOLDER WITH SEAM OF CAN TOWARD HANDLE OF THE HOLDER.
4. PLACE HOLDER WITH COFFEE CAN IN COFFEE MAKER, LATCHING HOLDER INTO BREW MECHANISM.
5. PRESS BREW BUTTON. CAN MOVES AUTOMATICALLY INTO BREW POSITION TO OPEN CAN AND COMMENCE BREWING PROCESS. BREW BUTTON LIGHTS UNTIL RESERVOIR IS FULL.
6. WHEN RESERVOIR REQUIRES REFILLING, CAN AUTOMATICALLY RETURNS TO THE BREW START POSITION.
7. UNLATCH CAN HOLDER FROM BREW MECHANISM AND REMOVE FROM COFFEE MAKER. DISCARD USED COFFEE CAN.
8. RINSE AND REPLACE THE RESERVOIR WHEN EMPTY.

9. TO STOP BREW—PRESS ON/OFF BUTTON.

As set forth in the operation guide above and the control diagram of FIG. 5, brewing may be stopped by pressing the on/off button 206. In addition, the system may alternately provide for manually release of the can by pressing the on/off button 206.

The spike 50 includes external longitudinal channels or flutes 55 along its outer periphery as best viewed in FIGS. 15 and 17. The flutes 55 are separated by shorter channels 56 spaced between them. The width of each flutes 55 is large enough to allow passage of liquid, namely the brewed coffee, along the flute but small or narrow enough to inhibit passage of coffee grounds out of the can 15.

The coffee maker 10 and brewing methods are equally applicable to preparation of other beverages such as tea.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A method for making coffee comprising the steps of
   inserting a can containing ground coffee into a can holder;
   piercing the can with first and second spikes by moving the can horizontally into the spikes, the spikes extending inside the can;
   injecting hot water into the can via an internal passage within the first spike;
   making brewed coffee by circulating the hot water within the can;
   directing the brewed coffee out of the can past at least one of the spikes and then into a reservoir.

2. A method according to claim 1 wherein the step of piercing the can comprises moving the first and second spikes into the can.

3. A method according to claim 1 further comprising inserting the can into the holder in an upright position and wherein the step of piercing the can comprises piercing a side of the can with the first and second spikes.

4. A method according to claim 1 further comprising
   providing longitudinal channels along an outer periphery of the first and second spikes and directing the brewed coffee out of the can along the channels;
   sizing the channels to allow exit of liquid and inhibit exit of coffee grounds therethrough.

5. A method for making coffee comprising the steps of
   inserting a can containing ground coffee into a can holder;
   piercing the can with first and second spikes, the spikes extending inside the can;
   injecting hot water into the can via a passage within the first spike;
   making brewed coffee by circulating the hot water within the can;
   directing the brewed coffee out of the can past at least one of the spikes and then into a reservoir;
   wherein the step of piercing the can comprises moving the can horizontally into the spikes, the second spike being positioned above the first spike.

6. A method for making coffee comprising the steps of
   inserting a can containing ground coffee into a can holder;
   piercing the can with first and second spikes, the spikes extending inside the can;
   injecting hot water into the can via a passage within the first spike;
   making brewed coffee by circulating the hot water within the can;
   directing the brewed coffee out of the can past at least one of the spikes and then into a reservoir;
   moving the can into the first and second spikes via a hydraulic actuator.

7. A method according to claim 6 further comprising
   actuating the hydraulic actuator via water pressure from a water supply.

8. A method for making coffee comprising the steps of
   inserting a can containing ground coffee into a can holder;
   piercing the can with first and second spikes, the spikes extending inside the can;
   injecting hot water into the can via a passage within the first spike;
   making brewed coffee by circulating the hot water within the can;
   directing the brewed coffee out of the can past at least one of the spikes and then into a reservoir;
   directing water from a potable inlet water supply into a heating tank;
   heating the water in the heating tank to a desired temperature;
   moving the can into the first and second spike via a hydraulic actuator;
   actuating the hydraulic actuator via water pressure from the inlet water supply.

9. A method for making coffee comprising the steps of
   inserting a can containing ground coffee into a can holder;
   piercing the can with first and second spikes, the spikes extending inside the can;
   injecting hot water into the can via a passage within the first spike;
   making brewed coffee by circulating the hot water within the can;
   directing the brewed coffee out of the can past at least one of the spikes and then into a reservoir;
   wherein the step of piercing the can comprises piercing a side of the can with the first and second spikes, and wherein the step of injecting hot water comprises injecting the hot water into a longitudinal passage within the first spike and then horizontally out through an opening in a side wall of the first spike.

10. A method for making coffee comprising the steps of
    inserting a can containing ground coffee into a coffee maker;
    automatically piercing the can with a spike;
    injecting hot water into the can via an opening within the spike;
    making brewed coffee by circulating the hot water within the can;
    directing the brewed coffee out of the can along outer periphery of the spike and into a reservoir.

11. A method according to claim 10 wherein the step of piercing the can comprises moving the can horizontally into the spike.

12. A method according to claim 10 further comprising
    moving the can into the spike via a hydraulic actuator and
    actuating the hydraulic actuator via water pressure from a water supply.

13. A method according to claim 10 further comprising inserting the can into the coffee maker in an upright position and piercing a side of the can with the spike.

14. A method according to claim 10 further comprising directing water from a potable inlet water supply into a heating tank;

heating the water in the heating tank to a desired temperature;

providing a hydraulic actuator actuated via water pressure from the inlet water supply;

moving the can into the spike via the hydraulic actuator.

15. A method according to claim 10 further comprising ceasing of the step of injecting hot water when level of the brewed coffee in the reservoir reaches a given height and drawing a desired amount of brewed coffee into a container.

16. A coffee maker for brewing coffee from a can of ground coffee, comprising a hot water inlet line;

a receptacle for receiving the can of ground coffee;

first and second spikes positioned to one side of said receptacle, said first spike having an internal passage connected to said hot water inlet line;

means for moving the can horizontally into the spikes thereby piercing the can with said spikes, wherein once the can is pierced by said first spike, hot water is injected into the can via said internal passage.

17. A coffee maker according to claim 16 wherein said first and second spikes include longitudinal channels sized large enough to permit exit of brewed liquid from the can but small enough to inhibit exit of coffee grounds from the can.

18. A coffee maker for brewing coffee from a can of ground coffee, comprising a hot water inlet line;

a receptacle for receiving the can of ground coffee;

first and second spikes positioned to one side of said receptacle, said first spike having an internal passage connected to said hot water inlet line, a hydraulic actuator for moving the can into said first and second spikes for piercing the can.

19. A coffee maker for brewing coffee from a can of ground coffee, comprising a hot water inlet line;

a receptacle for receiving the can of ground coffee;

first and second spikes positioned to one side of said receptacle, said first spike having an internal passage connected to said hot water inlet line, a pressurized potable water supply line;

a heating tank connected to said water supply line for heating water supplied by said water supply line to said hot water inlet line;

a hydraulic actuator for moving the can into said first and second spikes thereby piercing the can, said hydraulic actuator being connected to said water supply line, said water supply line providing hydraulic pressure for operating said hydraulic actuator;

a control valve on said water supply line upstream of said hydraulic actuator for controlling actuation of said hydraulic actuator.

20. A coffee maker for brewing coffee from a can of ground coffee, comprising a hot water inlet line;

a receptacle for receiving the can of ground coffee;

first and second spikes positioned to one side of said receptacle, said first spike having an internal passage connected to said hot water inlet line;

means for piercing the can with said spikes, wherein once the can is pierced by said first spike, hot water is injected into the can via said internal passage, wherein the receptacle is constructed and arranged to receive a can having cylindrical sides and flat ends, whereby the can is inserted into the coffee maker with the cylindrical sides of the can oriented vertically and wherein the can is actuated horizontally into said spikes piercing a side of the can.

21. A coffee maker according to claim 20 wherein said second spike is positioned above said first spike, each of said spikes having a pointed tip, each pointed tip piercing a side of the can when the can is moved into said spikes.

22. A coffee maker for brewing coffee from a can of ground coffee, comprising a hot water inlet line;

a receptacle for receiving the can of ground coffee;

first and second spikes positioned to one side of said receptacle, said first spike having an internal passage connected to said hot water inlet line;

means for piercing the can with said spikes, wherein once the can is pierced by said first spike, hot water is injected into the can via said internal passage, wherein said first spike comprises both an exit opening in a side wall thereof permitting exit of brewed liquid from the can and an inlet port for directing hot water into the can.

23. A method for making coffee comprising the steps of inserting a container containing ground coffee into a container holder;

directing water from a potable inlet water supply into a heating tank;

heating the water in the heating tank to a desired temperature;

positioning the container within the coffee maker via a hydraulic actuator;

actuating the hydraulic actuator via water pressure from the inlet water supply;

making brewed coffee by circulating the hot water through the container;

directing the brewed coffee into a reservoir.

\* \* \* \* \*

UNITED STATES PATENT AND TRADEMARK OFFICE
CERTIFICATE OF CORRECTION

PATENT NO. : 5,899,137
DATED : May 4, 1999
INVENTOR(S) : Paul E. Miller et al.

It is certified that error appears in the above-identified patent and that said Letters Patent is hereby corrected as shown below:

In the Drawing,
    On sheet 10 of 15, insert the legend -- Fig. 5 -- next to the lower figure on the page.

Signed and Sealed this

Twenty-sixth Day of September, 2000

Attest:

Q. TODD DICKINSON

Attesting Officer      Director of Patents and Trademarks